United States Patent [19]

Leiber

[11] Patent Number: 4,526,003
[45] Date of Patent: Jul. 2, 1985

[54] MASTER BRAKE CYLINDER FOR TWO-CIRCUIT BRAKING SYSTEMS

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 532,130

[22] Filed: Sep. 14, 1983

Related U.S. Application Data

[63] Continuation-in-part of Ser. No. 932,099, Aug. 9, 1978, abandoned, which is a continuation of Ser. No. 779,884, Mar. 21, 1977, abandoned.

[30] Foreign Application Priority Data

Mar. 27, 1976 [DE] Fed. Rep. of Germany ....... 2613219

[51] Int. Cl.$^3$ .............................................. B60T 17/22
[52] U.S. Cl. ........................................ 60/534; 60/538; 60/540; 60/545; 303/114
[58] Field of Search .................. 60/534, 535, 540, 545, 60/546, 547.1, 548, 581, 582, 591, 593, 537, 538, 543; 91/2, 35, 39, 275; 303/61, 92, 114

[56] References Cited

U.S. PATENT DOCUMENTS

| | | | |
|---|---|---|---|
| 3,686,864 | 8/1972 | Shutt | 60/582 |
| 3,698,772 | 10/1972 | Nixon | 303/61 |
| 3,827,759 | 8/1974 | Belart | 60/582 |
| 3,886,746 | 6/1975 | Farr | 60/547.1 |
| 3,910,645 | 10/1975 | Takeuchi | 303/114 |
| 3,963,277 | 6/1976 | Chiba | 303/61 |
| 3,999,808 | 12/1976 | Belart | 303/92 |
| 4,037,883 | 7/1977 | Fuchs | 303/61 |

Primary Examiner—Abraham Hershkovitz
Attorney, Agent, or Firm—Edwin E. Greigg

[57] ABSTRACT

A master cylinder for a two-circuit brake system which includes anti-skid control has two separate chambers and pistons. The main control piston is associated with an auxiliary piston which it engages after a predetermined amount of travel. The auxiliary piston has an extension which holds the brake control valve and which is opened by the control piston during its travel. Furthermore, the second circuit cylinder includes a pressure sensor which cooperates with double pistons which can activate a warning when the piston travel is not in a predetermined relation to the applied fluid pressure. Also included is an electronic switching circuit and associated valve mechanism for imparting a pulsating stroke to said double pistons.

3 Claims, 3 Drawing Figures

MASTER BRAKE CYLINDER FOR TWO-CIRCUIT BRAKING SYSTEMS

CROSS-REFERENCE TO RELATED APPLICATION

This application is a continuation-in-part of application Ser. No. 932,099, filed Aug. 9, 1978, which is a continuation of application Ser. No. 779,884, filed Mar. 21, 1977, both abandoned.

BACKGROUND OF THE INVENTION

The invention relates to improvements in a hydraulic brake booster for a vehicular brake system, which is actuated by a brake pedal and which further includes a valve controlling both the interconnection of a storage source with a pressure alternation chamber in the booster as well as the interconnection of the pressure alternation chamber with a relief station. A brake booster of this type is associated with a hydraulic dual-circuit main cylinder having a return spring biased double piston for the sealing of the primary and of the secondary side and also includes a lockable protection device which cooperates with an electronic switching circuit that controls a valve mechanism for the monitoring of the charge in the two brake circuits.

For a better understanding of this invention, reference is now made to the Leiber U.S. Pat. Nos. 4,141,595 and 4,143,514, which are incorporated herein by reference.

In brake systems equipped with this general type of brake booster, it has been found that the presence of air bubbles or gas bubbles which accumulate in the pressure medium can seriously impair the braking effect. Due to the compressibility of the air or gas cushion, a substantially greater piston travel must be introduced to achieve an adequate braking effect. However, this is not practical, since it would require a main cylinder length (circa 5 times greater) and thus this structure was achieved to overcome the deficiences of the known devices.

OBJECT AND SUMMARY OF THE INVENTION

Accordingly, it is the principal object of the present invention to provide an apparatus for a hydraulic brake booster of the general kind cited above, which makes it possible to automatically increase the brake pressure in the event of the formation of air or gas bubbles in the system, as a function of the main cylinder, without resorting to a particularly long piston travel.

This objective is achieved according to the present invention by the fact that the dual-circuit main cylinder is equipped with a monitoring device for its double piston and further that the electronic switching device contains a circuit which accepts the signals from the monitoring device and that the double piston executes a pulsating stroke motion, with the aid of the monitoring characteristic inherent to the valve mechanism in the lockage protection mode and with the aid of the return spring of the double piston.

In this manner, the main brake cylinder works automatically as a pump in the event that air or gas bubbles form in the brake system. Meanwhile, the main cylinder automatically continues to suck the brake fluid and to expel it until a corresponding pressure rise is attained in the malfunctioning brake circuit.

A further characteristic refinement of the present invention is the fact that a time measuring device is utilized, with the assistance of which the pulsating motion of the double piston is discontinuable after a certain time interval.

As a result the pumping action of the main cylinder ceases whenever a rupture occurs in a brake line; consequently no further pressure increase can be obtained.

Other objects and advantages of the present invention will be more readily apparent from a further consideration of the following detailed description of the drawing illustrating a preferred embodiment of the invention, in which:

DESCRIPTION OF THE PREFERRED EMBODIMENT

Figure 1:
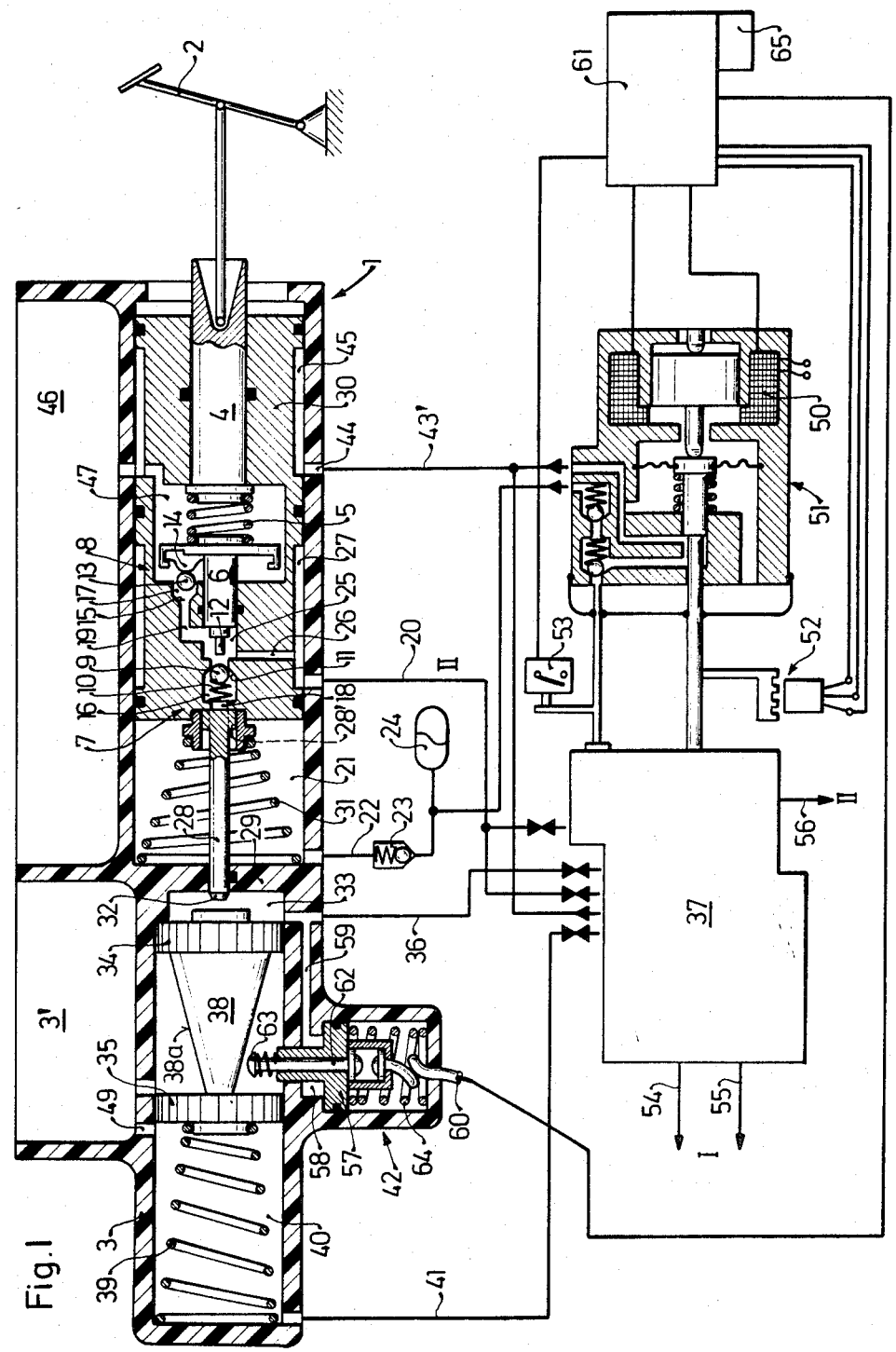
FIG. 1 is a partially sectional and partially schematic diagram of the preferred embodiment of the invention.

Turning now to the drawing, a hydraulic brake booster 1 is located between a pedal 2 and a hydraulic dual-circuit main cylinder 3 of a tandem construction. The brake booster 1 has an actuating rod 4 which acts via a travel spring 5 on a push rod 6 of a double valve 7 and 8. The valve 7 of the double valve construction is an inlet valve. It is oriented coaxially relative to the actuating rod 4 and includes a spherical closure body 9 which ordinarily rests on its valve seat 11 under the force of a spring 10 and which can be lifted off its seat 11 by means of an extension 12 provided on the push rod 6. The valve 8 comprises the outlet valve of the brake booster 1 and is offset from the center line of the cylinder and oriented parallel to the axis thereof. A closure body 13 in the form of a sphere is actuated by a projection 14 which offstands adjacent to the push rod 6 and the projection 14 is arranged to urge the ball valve 13 against a valve seat 15.

The two valve seats 11 and 15 are included in borings 16 and 17 of ducts 18 and 19 provided in a booster piston 30. As shown, the duct 19 leads to a control pressure chamber 25 that surrounds the push rod extension 12 and a radial duct 26 exits from chamber 25 and leads to an annular chamber 27 provided between the booster piston 30 and the cylinder wall of the booster 1. This annular chamber 27 connects via a line 20 with the brake circuit II.

The duct 18 leads via several axial passages 28' into a storage pressure chamber 21. The pressure chamber 21 is constructed so as to have a push rod 28, that is attached to the booster piston 30, extend entirely therethrough and thence through a perforation in the wall 29, said latter wall being integral with the booster 1 and cooperating with the inlet valve 7 to form the separation wall 29 and the booster piston 30. A strong spring 31 coaxially encircles the push rod 28 and is disposable at one end against the wall 29. The storage pressure chamber 21 is connected via a pressure line 22 that contains a check valve 23 to the pressure side of a pump 51 and to a pressure reservoir or accumulator 24.

Figure 2:
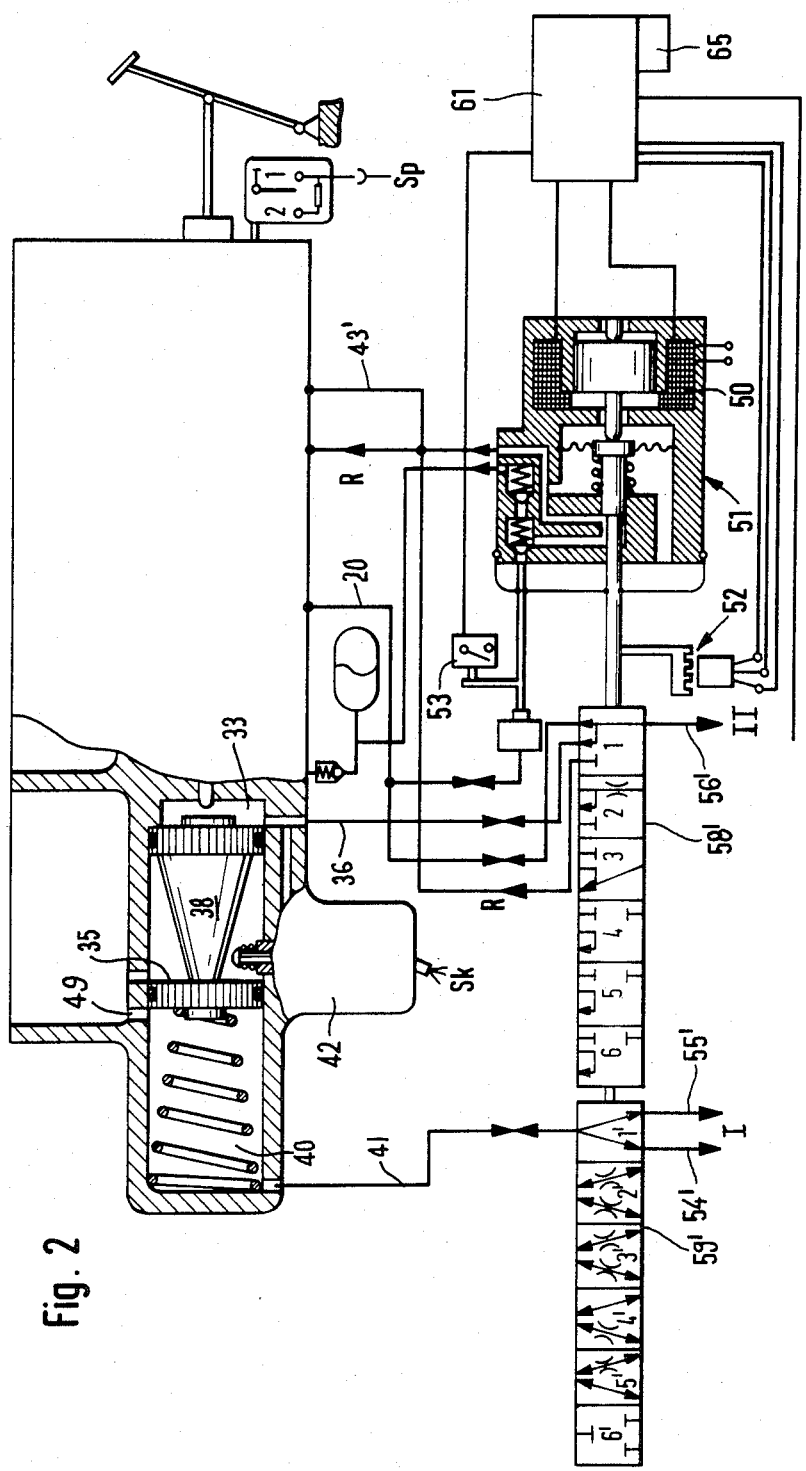
FIG. 2 illustrates an embodiment of the invention employing a six-stage valve embodied as a slide valve.

The free end 32 of the push rod 28 protrudes through the wall 29 into a primary pressure chamber 33 of the main cylinder 3. The pressure chamber 33 is bounded by an end wall of piston 34 of double pistons 34 and 35, and connects via a branch line 36 to a valve mechanism 37 to which a line 20 is also connected. The valve mechanism 37 is constructed as a multi-position valve and includes a control rod. The valve mechanism 37 includes the valve arrangement as shown in FIG. 1 of U.S. Pat. No. 4,141,595 for controlling the fluid pressure to the outlets 54-55 and 56 for controlling the wheel brakes. FIG. 2 shows a slide valve arrangement as set forth in U.S. Pat. No. 4,141,595. The slide valve as contained herein includes six stages to satisfy the concept of the invention whereas in the slide valve in U.S. Pat. No. 4,141,595 shows only five positions. The valve 37 represents a multi-position double valve such as shown in FIG. 2. The positions 2-5 serve to vary the pressure in the individual regulating channels differently during brake regulation; as set forth in U.S. Pat. No. 4,141,595 for pumping with the piston 34/35, the valve is switched in alternation back and forth between positions 1 and 6, with switching position 1 causing advancement of the piston and switching position 6 causing retraction of the piston. The valve mechanism can alternatively consist of several magnetic valves. The control slide of the valve mechanism (not shown) is positioned by means of electromagnet 50 which serves simultaneously as the propulsive element of a pump 51. The control slide is coupled to an electrical position indicator 52 in order that the control supplied is capable of assuming various control attitudes. A locking protection switch 53 which disables the pump 51 when the valve mechanism 37 is actuated is also provided between the valve mechanism 37 and the pump 51.

The valve mechanism 37 assures the actual charging of both the front axle brake lines 54 and 55 (brake circuit I) as well as that of a rear axle brake line 56 (brake circuit II). The two pistons 34 and 35 of the hydraulic main cylinder 3 are fixedly attached to one another by means of a frustum 38 which includes a converging surface 38a that extends toward secondary piston 35. A return spring 39 has one end wall area in abutment with the base of the main cylinder 3 and its other end wall area abuts against the piston 35. A chamber 40 positioned between the base of the main cylinder and the piston 35 provides the secondary pressure chamber of the main cylinder 3. A line 41 which extends from the brake circuit I connects the chamber 40 with the valve mechanism 37. The chamber 40 can also communicate via a vent hole 49 with a refill container 3'.

A monitoring device 42 constructed as a position sensor is formed as an integral part of the booster body provided adjacent to the main cylinder 3. However, the monitoring device 42 can also be constructed as a differential pressure valve which will respond to the occurrence of differing pressures between the brake circuits I and II.

In the exemplary embodiment of this invention, a position sensor is used which possesses a piston 57 that is adapted to be biased by a spring 64. On its side remote from the spring 64, the piston 57 encloses a working chamber 58 which communicates at all times with the primary pressure chamber 33 via a longitudinal duct 59. The piston 57 carries a piston rod 62 the end portion 63 of which is intended to cooperate with the wall 38a of the frustum 38 of the double piston 34/35. When the end 63 touches the wall 38a, current will flow in an electrical line connection 60 that is incorporated into the piston 57 and thence leads to an electronic circuit 61 to which the position indicator 52, the electromagnet 50, the locking protection switch 53, and several wheel sensors, now shown, are also connected. All the incoming signals are electronically processed in this circuit 61, and it should be noted that all of the corresponding line interconnection commands originate therein.

Figure 3:
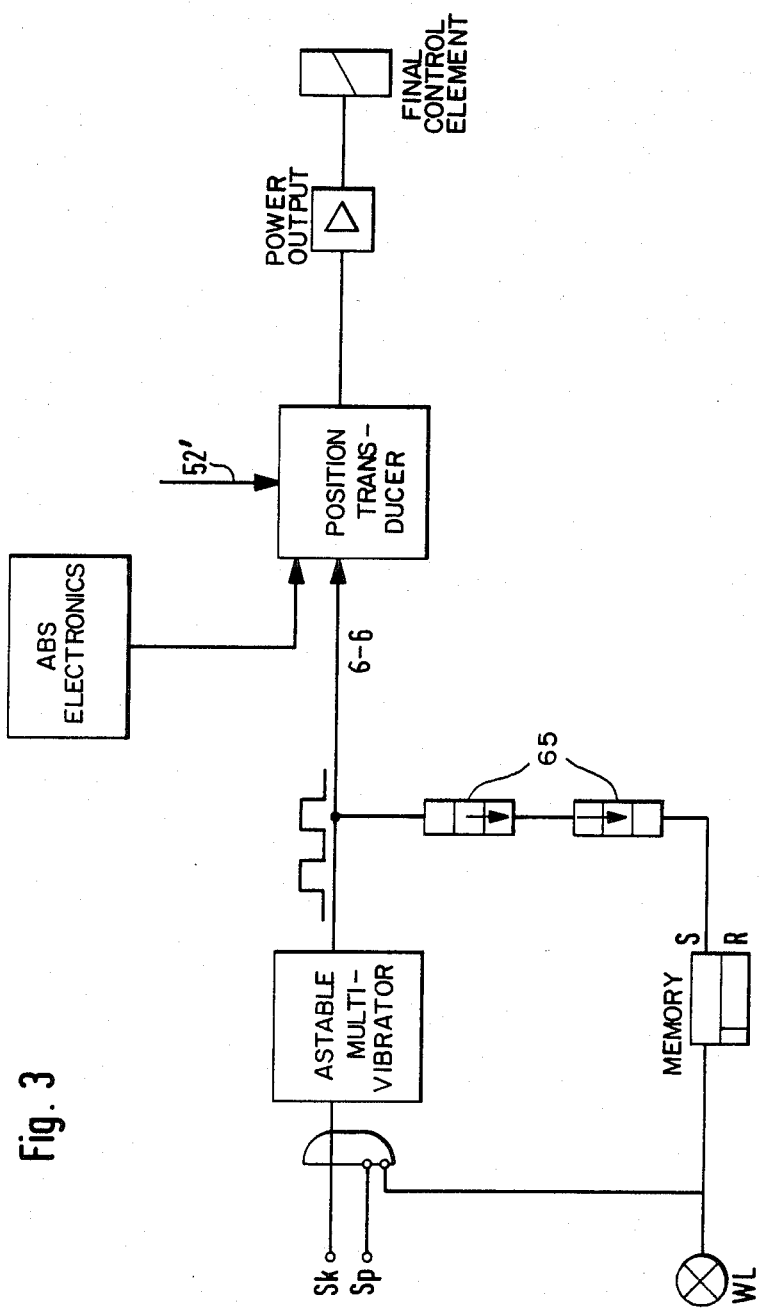
FIG. 3 illustrates a logic control circuit.

The control circuit 61, for controlling the piston position transducer is shown in the logic circuit FIG. 3. The switching signal of the piston position transducer Sk acts via an AND gate upon an astable multivibrator, the pulse train of which is furnished to a position regulating loop circuit. The trigger pulse, via the position regulating loop, effects the position 6-6'. Further signals also act upon the position regulating loop, specifically the control signals of the ABS (anti-skid brake system) electronics, which determine the remaining valve positions, and the signals 52' of the position transducer as a feedback signal of the valve position. The output signal acts via a power stage upon the final control element. Since for safety reasons the trigger time of the astable multivibrator is limited, the multivibrator is monitored by a time measuring device 65. In the first timing element, the trigger signal is prolonged, thus bridging over the following interval. The output signal acts upon a further timing element UV which functions as a retarding member. If the trigger signal is present for longer than, say, one second, then a memory W is set, the output signal of which acts upon the AND gate α and blocks the trigger signal of the piston position transducer. Simultaneously, a warning lamp is triggered with this signal. The trigger signal of the piston position transducer Sk is blocked in the same direction via the reservoir pressure switch SP of the latter. IN that case, there is insufficient reservoir pressure, which makes the functioning of the pumping main brake cylinder impossible.

It is also to be noted that the suction side of the pump 51 is connected in the brake booster 1 with an annular recess 45 provided in the perimeter of the booster piston 30 and in turn communicates with a refill container 46 as well as with a relief chamber 47 in the booster piston 30. The relief chamber 47 encloses the travel spring 5 for the actuating rod 4 and projection 14 for operating ball valve 13.

OPERATION

The brake booster disclosed by the present invention is designed to function in the following manner:

The movable parts of the brake booster, when the brake has been released, then assume the positions depicted in the drawing.

When, during braking, the pedal 2 is actuated by means of the push rod 6, the outlet valve 8 is first closed, i.e., after the traversal of the gap bridged by the travel spring 5. The closure of the outlet valve 8 interrupts the connection of the brake circuit II with the refill container 46.

During a continued longitudinal movement of the pedal 2, the extension 12 provided on the push rod 6 presses the spherical inlet valve 9 open. At this time pump pressure produced by pump 51 and accumulator 24 via line 22 and pressure chamber 21 that flows through the enlarged bore 16 can now propagate via the control pressure chamber 25 passage 26 and via the line 20 into the brake circuit II via line 56. However, it is to be noted that this pressure also acts via the line 36 in the primary pressure chamber 33.

FIG. 2 shows the normal position (partial braking position) of the multi-position valve 37 (FIG. 1). From FIG. 2 it is apparent that the pressure line 20, in the normal position, communicates via the line 54' with the brake circuit II, while the primary pressure chamber 33

(FIG. 1) is acted upon from the pressure line 20 via the pressure line 36 (FIG. 1) and the multi-position valve 58' (FIG. 2).

The double pistons 34 and 35 that are spaced apart by the frustum 38 are displaced to the left (as shown in the drawing) in opposition to the force of the return spring 39. After the piston 35 travels past the vent hold 49, the pressurized fluid in the chamber 40 is then conducted via the line 41 into the brake circuit I via lines 54 and 55 (FIG. 1) or via the valve section (1') of valve 58' (FIG. 2) of the multi-purpose valve via lines 54' and 55'.

The pressure in the brake circuit I herein depends upon the pressure in the brake circuit II due to pressure chamber 33 and pistons 34/35. The integral axially perforated wall 29 provided between the storage pressure chamber 21 and the primary pressure chamber 33 makes this interdependent regulation possible. The pressure in the brake circuit II, in the normal position of the multi-position valve 37, is also conducted via the longitudinal duct 59 into the working chamber 58 of the position sensor 42.

The piston 57 of sensor 42 is thus arranged to compress the spring 64 and the rod 62 is moved downwardly away from the wall 38a of the frustum 38 that is interposed between the double pistons 34 and 35 can now move unhindered without making any electrical contact with the rod 62. When the system is functioning correctly, the movements of the pistons 34/35 and 57 are effected in synchronism exclusively by the fluid pressure in chamber 33 and the end 63 of the piston rod 62 does not touch the frustum 38. Accordingly, when the primary pressure is low the excursions of the pistons 34/35 and 57 are short, and when the primary pressure is high, the excursions are long.

However, if air or gas bubbles are present in the brake circuit I, then the available volume in this brake circuit can be so large that a reliable braking of the vehicle by means of the still functioning brake circuit II is not, or else is barely, possible. In the event of this kind of malfunction, the double pistons 34/35 execute an elongated stroke relative to the piston 57, which while still a function of the pressure in the primary pressure chamber 33, obtains its increased excursion as a result of the lower secondary pressure in brake circuit I. Since the given primary pressure also prevails in the working chamber 58, the unchanged opposing forces acting on the piston 57 cause it to lag relative to the double pistons 34/35, and by reason of this the end 63 of the piston rod 62 touches the convergent wall 38a of the frustum 38 to complete the electrical circuit to the switching circuit.

At this time the electrical contact is now made, and a current flows in the line 60 and reaches the switching circuit 61. A corresponding electronic switch in the switching circuit 61 now effects a switching of the multi-position valve mechanism 37, which causes the multi-position valve 37 (FIG. 1) to switch into the position 6-6' (FIG. 2). The two valve outlets 54' and 55' to the brake circuit I are then separated from the main cylinder chamber 40. The primary pressure chamber 33 is connected via the valve position 6 (FIG. 1). An outlet valve is simultaneously opened in the brake circuit II for a pressure reduction. These valve actions thus result in the condition that the primary pressure chamber 33 is relieved of pressure and the force of the return spring 39 which acts on the double pistons 34/35 predominates, thereby serving to return the double pistons 34/35 to their initial position.

Since the electrical contact at the double pistons 34/35 is thereby once again opened, a reversal of the electronic switch in the switching circuit 61 takes place. The multi-position valve 37 is thereby switched back into the position 1-1', so that the pressure in the primary pressure chamber 33 rises once again. The double piston 34/35 travels toward the left and pumps brake fluid via the line 41 (FIG. 1) and the open valve position 1' into the brake circuit I. If the contact on the rod 62 again touches wall 38a of frustum 38 provided between the double pistons 34/35 the circuit is again completed, then the back and forth motion of the double pistons 34/35 is repeated as set forth immediately above. The double pistons 34/35 hence execute a pulsating stroke movement, that is, a pumping action takes place.

If the position sensor 42 continues to make a repeated contact after a relatively long period of time, for example after 1 second, then that condition signifies a total failure of the brake circuit I. In that case, the described pumping process is then discontinued by means of a time measuring device 65 that is associated with the switching circuit 61, so that only brake pressure in the brake circuit II is then still present.

It is also to be noted that the signal from the monitoring device 42 must be nullified by the switching circuit 61 at least briefly, whenever typical locking protection regulation signals are evaluated by the associated circuitry, in other words, whenever the pressure of a wheel brake cylinder is to be reduced due to reasons related to locking protection.

What is claimed is:

1. In a hydraulic brake booster for a vehicle brake system of the type having primary and secondary sides and actuated by a brake pedal and which includes valve means for controlling both the interconnection of a storage source with a pressure alternation chamber in the booster as well as the interconnection of the pressure alternation chamber with a relief station, the booster being connected with a hydraulic dual circuit main cylinder having a return spring biased double piston for pressurizing the primary and secondary sides of the system and which further includes a locking protection device arranged to cooperate with an electronic switching circuit which controls a valve mechanism for controlling the application of hydraulic fluid in the two brake systems, the improvement comprising:

sensing means communicating with said dual circuit main cylinder for indicating an abnormally low braking pressure in one of said braking circuits; and hydraulic means actuated whenever said sensing means detects an abnormally low braking pressure for causing said double piston to execute a series of pumping strokes to raise the pressure to normal in said circuit.

2. Apparatus as defined by claim 1 in which said double pistons are interconnected by a frustum and said sensing means comprises an electrical contact positioned in said main cylinder in the path of movement of said frustum.

3. Apparatus as defined in claim 1, including time controlled means connected to discontinue operation of said hydraulic means after a predetermined time interval.

* * * * *